United States Patent
Li et al.

(10) Patent No.: US 10,542,441 B1
(45) Date of Patent: Jan. 21, 2020

(54) METHOD, COMPUTER DEVICE AND STORAGE MEDIUM FOR MATCHING MOBILE HOTSPOT WITH MOBILE POINT OF INTEREST

(71) Applicant: BAIDU ONLINE NETWORK TECHNOLOGY (BEIJING) CO., LTD., Beijing (CN)

(72) Inventors: Yanyan Li, Beijing (CN); Jianguo Duan, Beijing (CN); Hui Xiong, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/443,735

(22) Filed: Jun. 17, 2019

(30) Foreign Application Priority Data

Aug. 9, 2018 (CN) .......................... 2018 1 0901543

(51) Int. Cl.
*H04W 16/18* (2009.01)
*H04W 64/00* (2009.01)
*H04W 84/00* (2009.01)

(52) U.S. Cl.
CPC .......... *H04W 16/18* (2013.01); *H04W 64/00* (2013.01); *H04W 84/005* (2013.01)

(58) Field of Classification Search
CPC .... H04W 16/18; H04W 84/005; H04W 64/00
See application file for complete search history.

(56) References Cited

FOREIGN PATENT DOCUMENTS

| CN | 102567497 A | 7/2012 |
|---|---|---|
| CN | 104978420 A | 10/2015 |
| CN | 106575294 A | 4/2017 |

OTHER PUBLICATIONS

The First Office Action dated May 17, 2019 in Cn application 201810901543.9 with translation from Google Translate.
Search Report for CN 2018109015439 and its English translation provided by Google Translate.

*Primary Examiner* — Nam T Huynh
(74) *Attorney, Agent, or Firm* — Ladas & Parry, LLP

(57) ABSTRACT

A method, a computer device and a storage medium for matching a mobile hotspot with a mobile point of interest are proposed. The method includes: dividing a spatial region into a plurality of grid cells of a predetermined size, and generating an index for each of the plurality of grid cells; for each mobile POI of a plurality of mobile POIs in the spatial region, determining respectively indexes of grid cells through which a transport route of the mobile POI passes, to obtain a first index encoding result of the mobile POI, the mobile POI being a transport vehicle having a fixed commuting route; for a mobile hotspot in the spatial region, obtaining a movement trajectory of the mobile hotspot, determining respectively indexes of grid cells through which the movement trajectory passes, to obtaining a second index encoding result of the mobile hotspot; matching the mobile hotspot with a mobile POI of the plurality of mobile POIs according to a similarity between the first index encoding result and the second index encoding result. The technical solutions of the present disclosure may be applied to reduce the implementation cost and improve the processing efficiency and the accuracy of the processing result.

9 Claims, 4 Drawing Sheets

METHOD, COMPUTER DEVICE AND STORAGE MEDIUM FOR MATCHING MOBILE HOTSPOT WITH MOBILE POINT OF INTEREST

CROSS REFERENCE TO RELATED APPLICATIONS

The present application claims the priority to Chinese Patent Application No. 201810901543.9, filed on Aug. 9, 2018, with the title of "Method, apparatus, and storage medium for matching mobile hotspot with mobile point of interest". The disclosure of the above application is incorporated herein by reference in its entirety.

TECHNICAL FIELD

The present disclosure relates to computer application technologies, and particularly to a method, a computer device and storage medium for matching a mobile hotspot with a mobile point of interest.

BACKGROUND

In practical application, it is required to build a mapping relationship between a mobile hotspot and a mobile point of interest (POI), namely, match the mobile hotspot with the mobile POI, and determine mobile POIs respectively corresponding to different mobile hotspots. The mobile POI refers to a transport vehicle having a fixed commuting route, for example, bus Route 112 or subway Line 13.

It is feasible to, based on the above mapping relationship, explore for properties of the transport vehicle such as real-time public transport or real-time subway according to related features or data of the mobile hotspot, determine the user's travel manner through the user's scanning of the mobile hotspot information, and perform user portrait, and so on.

At present, the above mapping relationship is mainly established in the following manners: (1) a specially-assigned person is employed to collect, provide equipment and training, and collect the correspondence relationship between the mobile POI and the mobile hotspot; (2) a crowdsourcing manner is adopted, and a crowdsourcing user uploads the mobile POI corresponding to the mobile hotspot.

However, in the above manner (1), it is required to employ a special person and provide equipment and training, so the implementation cost is high; furthermore, the number of persons employed is limited, and it takes a longer period of time to cover main cities and business districts, so the efficiency is low. In the above manner 2), since crowdsourcing users have different professional qualities, so the accuracy of the uploaded data is hard to ensure.

SUMMARY

In view of the above, the present disclosure proposes a method, apparatus and storage medium for matching a mobile hotspot with a mobile point of interest.

Specific technical solutions are as follows:

According to an embodiment, a method for matching a mobile hotspot with a mobile POI is proposed, the method includes:

dividing a spatial region into a plurality of grid cells of a predetermined size, and generating an index for each of the plurality of grid cells;

for each mobile POI of the plurality of mobile POIs in the spatial region, determining respectively indexes of grid cells through which a transport route of the mobile POI passes, to obtain a first index encoding result of the mobile POI, the mobile POI being a transport vehicle having a fixed commuting route;

for a mobile hotspot in the spatial region, obtaining a movement trajectory of the mobile hotspot, determining respectively indexes of grid cells through which the movement trajectory passes, to obtain a second index encoding result of the mobile hotspot;

matching the mobile hotspot with a mobile POI of the plurality of mobile POIs according to a similarity between the first index encoding result and the second index encoding result.

According to an embodiment of the present disclosure, the obtaining a movement trajectory of the mobile hotspot may include:

determining the movement trajectory of the mobile hotspot according to obtained hotspot information scanned by a user.

According to an embodiment of the present disclosure, before matching the mobile hotspot with a mobile POI of the plurality of mobile POIs, the method may further include:

building an inverted index according to the first index encoding results of the plurality of mobile POIs in the spatial region, the inverted index recording one or more mobile POIs corresponding to indexes of different grid cells respectively, and the one or more mobile POIs passing through the different grid cells respectively;

the matching the mobile hotspot with a mobile POI of the plurality of mobile POIs may include:

selecting one or more candidate mobile POIs corresponding to the mobile hotspot from the plurality of mobile POIs in the spatial region, according to the second index encoding result of the mobile hotspot and the inverted index;

selecting a mobile POI matched with the mobile hotspot from the one or more candidate mobile POIs, according to the similarity between the first index encoding result of each of the one or more candidate mobile POIs and the second index encoding result of the mobile hotspot.

According to an embodiment of the present disclosure, the selecting one or more candidate mobile POIs corresponding to the mobile hotspot from the plurality of mobile POIs in the spatial region may include:

for an index of each grid cell in the second index encoding result of the mobile hotspot, determining one or more mobile POIs corresponding to the index by querying the inverted index, and taking the determined one or more mobile POIs as the one or more candidate mobile POI.

According to an embodiment of the present disclosure, the selecting a mobile POI matched with the mobile hotspot from the one or more candidate mobile POIs may include:

calculating a similarity score between the first index encoding result of each candidate mobile POI and the second index encoding result of the mobile hotspot, and determining a candidate mobile POI with a highest score as the mobile POI matched with the mobile hotspot.

According to an embodiment of the present disclosure, the calculating a similarity score between the first index encoding result of each candidate mobile POI and the second index encoding result of the mobile hotspot may include:

for each candidate mobile POI, performing the following processing:

determining a number of indexes which are included both in the first index encoding result of the candidate mobile POI and the second index encoding result of the mobile hotspot;

calculating a quotient obtained by dividing the number of indexes which are included both in the first index encoding result of the candidate mobile POI and the second index encoding result of the mobile hotspot by a number of indexes included in the second index encoding result of the mobile hotspot;

taking a calculation result as a similarity score between the first index encoding result of the candidate mobile POI and the second index encoding result of the mobile hotspot.

According to an embodiment of the present disclosure, the determining a candidate mobile POI with a highest score as the mobile POI matched with the mobile hotspot further includes:

under the condition that the score of the candidate mobile POI with the highest score is greater than a predetermined threshold, determining the candidate mobile POI with the highest score as the mobile POI matched with the mobile hotspot.

According to an embodiment, an apparatus for matching a mobile hotspot with a mobile POI is proposed, the apparatus includes: a dividing unit, a first processing unit, a second processing unit and a matching unit;

the dividing unit is configured to divide a spatial region into a plurality of grid cells of a predetermined size, and generate an index for each of the plurality of grid cells;

the first processing unit is configured to, for each mobile POI of the plurality of mobile POIs in the spatial region, determine respectively indexes of grid cells through which a transport route of the mobile POI passes, to obtain a first index encoding result of the mobile POI, the mobile POI being a transport vehicle having a fixed commuting route;

the second processing unit is configured to, for a mobile hotspot in the spatial region, obtain a movement trajectory of the mobile hotspot, determine respectively indexes of grid cells through which the movement trajectory passes, to obtain a second index encoding result of the mobile hotspot;

the matching unit is configured to match the mobile hotspot with a mobile POI of the plurality of mobile POIs according to a similarity between the first index encoding result and the second index encoding result.

According to an embodiment of the present disclosure, the second processing unit determines the movement trajectory of the mobile hotspot according to obtained hotspot information scanned by a user.

According to an embodiment of the present disclosure, the first processing unit is further configured to build an inverted index according to the first index encoding results of the plurality of mobile POIs in the spatial region, the inverted index recording one or more mobile POIs corresponding to indexes of different grid cells respectively, and the one or more mobile POIs passing through the different grid cells respectively;

the matching unit selecting one or more candidate mobile POIs corresponding to the mobile hotspot from the plurality of mobile POIs in the spatial region, according to the second index encoding result of the mobile hotspot and the inverted index;

selecting a mobile POI matched with the mobile hotspot from the one or more candidate mobile POIs, according to the similarity between the first index encoding result of each of the one or more candidate mobile POIs and the second index encoding result of the mobile hotspot.

According to an embodiment of the present disclosure, the matching unit, for an index of each grid cell in the second index encoding result of the mobile hotspot, determine one or more mobile POIs corresponding to the index by querying the inverted index, and take the determined one or more mobile POIs as the one or more candidate mobile POI.

According to an embodiment of the present disclosure, the matching unit calculates a similarity score between the first index encoding result of each candidate mobile POI and the second index encoding result of the mobile hotspot, and determines a candidate mobile POI with a highest score as the mobile POI matched with the mobile hotspot.

According to an embodiment of the present disclosure, the matching unit, for each candidate mobile POI, performs the following processing:

determining a number of indexes which are included both in the first index encoding result of the candidate mobile POI and the second index encoding result of the mobile hotspot;

calculating a quotient obtained by dividing the number of indexes which are included both in the first index encoding result of the candidate mobile POI and the second index encoding result of the mobile hotspot by a number of indexes included in the second index encoding result of the mobile hotspot;

taking a calculation result as a similarity score between the first index encoding result of the candidate mobile POI and the second index encoding result of the mobile hotspot.

According to an embodiment of the present disclosure, the matching unit is further configured to, under the condition that the score of the candidate mobile POI with the highest score is greater than a predetermined threshold, determine the candidate mobile POI with the highest score as the mobile POI matched with the mobile hotspot.

According to an embodiment of the present disclosure, a computer device is proposed. The computer device includes a memory, a processor and a computer program which is stored on the memory and runs on the processor, and the processor, upon executing the program, implements the above-described method.

According to an embodiment of the present disclosure, it is proposed a computer-readable storage medium on which is stored, and the program, when executed by the processor, implements the above-described method.

As may be seen from the above, according to the technical solutions of the embodiments of the present disclosure, it is unnecessary to employ a special person to provide equipment and training, and thus the implementation cost may be reduced and the processing efficiency may be improved. Furthermore, a mobile hotspot may be matched with a mobile POI of a plurality of mobile POIs based on the similarity between the index encoding results of the mobile hotspot and mobile POI, and thus the accuracy of the processing result may be ensured.

DETAILED DESCRIPTION

Technical solutions of the present disclosure will be described in more detail in conjunction with figures and embodiments to make technical solutions of the present disclosure clear and more apparent.

Obviously, the described embodiments are partial embodiments of the present disclosure, not all embodiments. Based on embodiments in the present disclosure, all other embodiments obtained by those having ordinary skill in the art without making inventive efforts all fall within the protection scope of the present disclosure.

Figure 1:
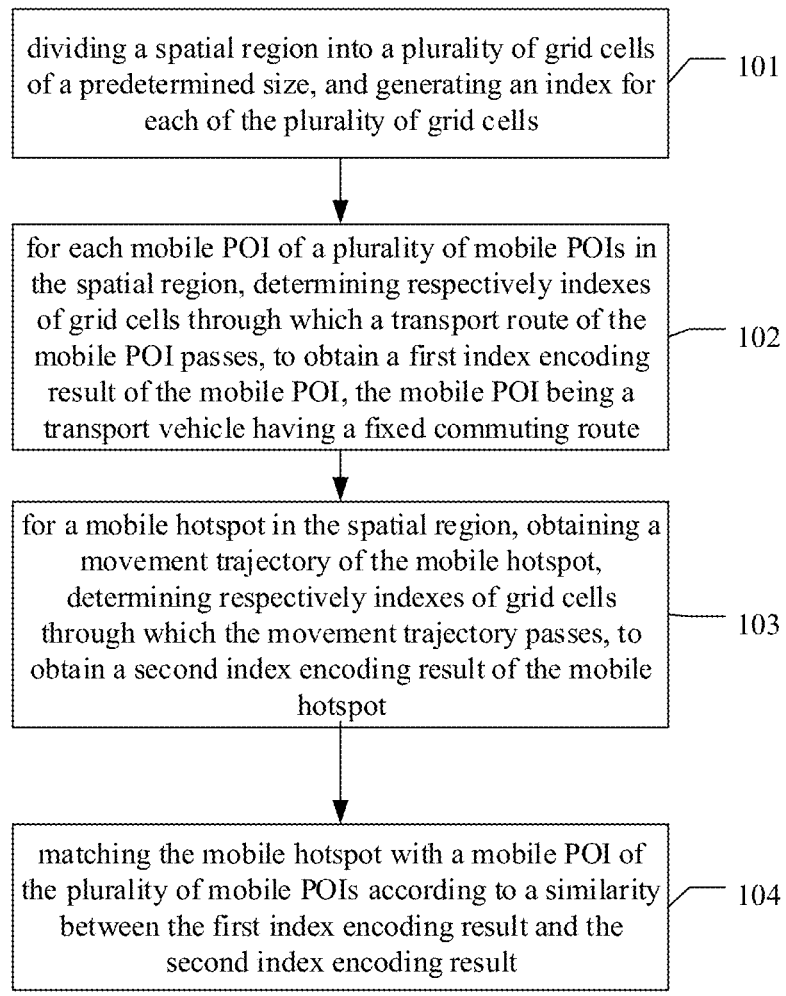
FIG. 1 is a flow chart illustrating a method for matching a mobile hotspot with a mobile point of interest according to an embodiment of the present disclosure.

FIG. 1 is a flow chart illustrating a method for matching a mobile hotspot with a mobile point of interest according to an embodiment of the present disclosure. As shown in FIG. 1, the embodiment includes the following implementations.

In 101, dividing a spatial region into a plurality of grid cells of a predetermined size, and generating an index for each of the plurality of grid cells.

In 102, for each mobile POI of a plurality of mobile POIs in the spatial region, determining respectively indexes of grid cells through which a transport route of the mobile POI passes, to obtain a first index encoding result of the mobile POI, and the mobile POI being a transport vehicle having a fixed commuting route.

In 103, for a mobile hotspot in the spatial region, obtaining a movement trajectory of the mobile hotspot, determining respectively indexes of the grid cells through which the movement trajectory passes, to obtain a second index encoding result of the mobile hotspot.

In 104, matching the mobile hotspot with a mobile POI of the plurality of mobile POIs according to a similarity between the first index encoding result and the second index encoding result.

The spatial region may refer to any spatial region, for example, regard the city of Beijing as a spatial region or the whole country as a spatial region.

Figure 2:
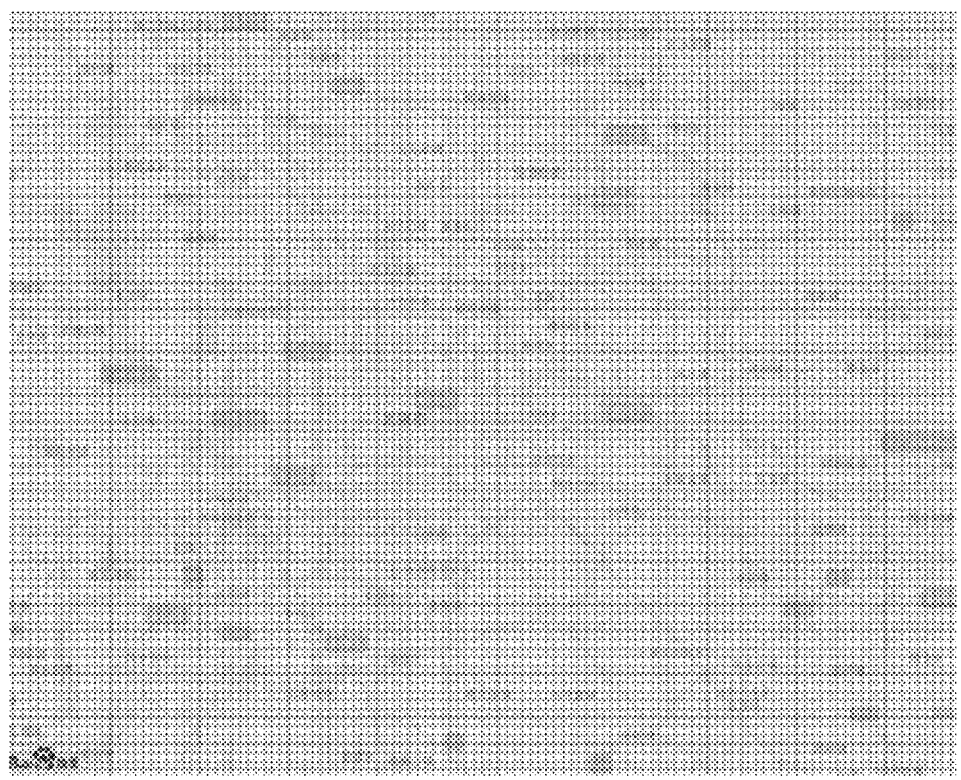
FIG. 2 is a schematic diagram of a division manner according to an embodiment of the present disclosure.

The spatial region may be first divided according to grid cells of a predetermined size. For example, the spatial region may be divided into a plurality of grid cells of the same size, as shown in FIG. 2, which is a schematic diagram of a division manner according to an embodiment of the present disclosure.

Figure 3:
FIG. 3 a schematic diagram of indexes of grid cells according to an embodiment of the present disclosure.

Furthermore, an index of each grid cell may be generated as a grid cell number. How to generate the index is not limited, but the index of each grid cell needs to be different from indexes of other grid cells, that is, the index of each grid cell is unique, as shown in FIG. 3, which is a schematic diagram of indexes of grid cells according to an embodiment of the present disclosure.

For each mobile POI in the spatial region, indexes of grid cells through which the transport route of the mobile POI passes may be respectively determined, thereby obtaining the first index encoding result of the mobile POI.

Figure 4:
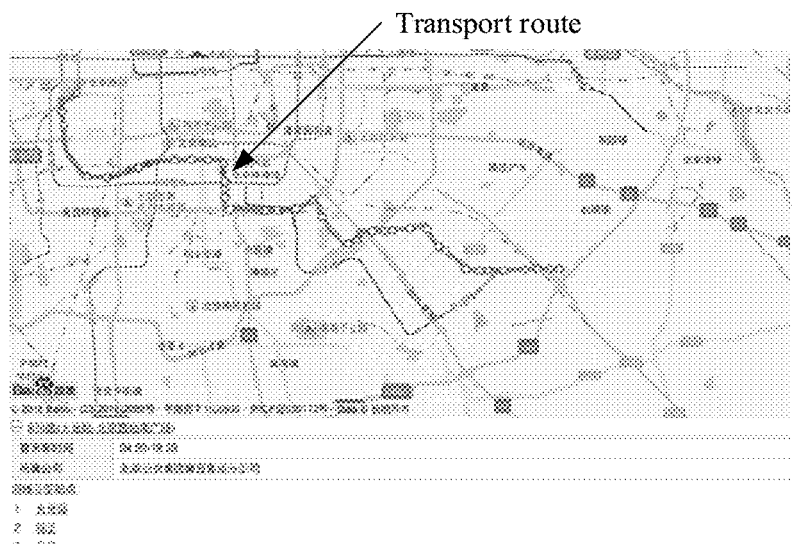
FIG. 4 is a schematic diagram of a transport route of bus route 820 in the city of Beijing.

The mobile POI is a transport vehicle having a fixed commuting route, and may include a bus, a subway, a train, and the like. For each mobile POI, its transport route is known, as shown in FIG. 4, which is a schematic diagram of a transport route of bus Route 820 in the city of Beijing. Correspondingly, the grid cells the transport route has passed and thus the index of each of the grid cells may be determined, and thereby obtain an index encoding result of bus Router 820 as a mobile POI. Herein, the index encoding result of the mobile POI may be referred to as the first index encoding result to differentiate from the subsequently-appearing index encoding result of mobile hotspots.

In addition, it is possible to, for each mobile hotspot in the spatial region, obtain the movement trajectory of the mobile hotspot, and determine respectively indexes of the grid cells through which the movement trajectory passes, and thereby obtain the second index encoding result of the mobile hotspot. To differentiate from the foregoing index encoding result of the mobile POI, the index encoding result of the mobile hotspot may be referred to as the second index encoding result.

The movement trajectory of each mobile hotspot may be determined according to obtained hotspot information scanned by a user.

Figure 5:
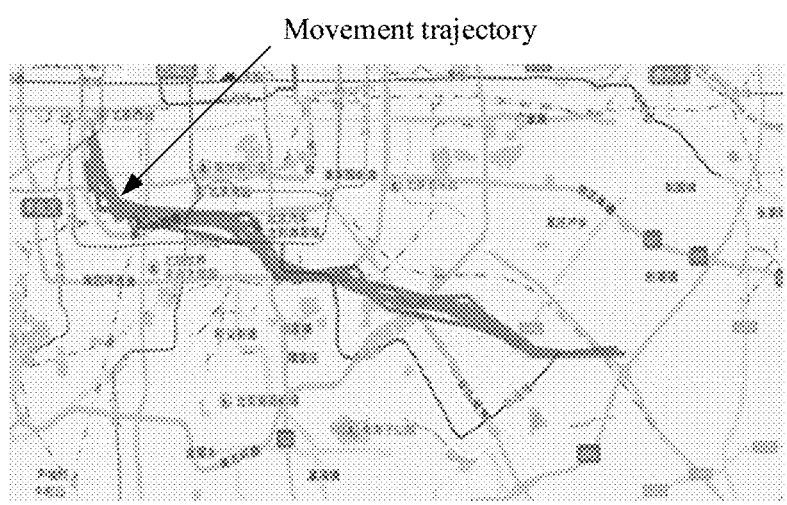
FIG. 5 is a schematic diagram of a movement trajectory of bus route 820 as shown in FIG. 4.

A user who is active in the spatial region may report the scanned hotspot information which for example may include scanned media access control (MAC) address of wifi, signal strength, corresponding base station and scanning time, a location point of the user can be known, and then the movement trajectory of each hotspot may be determined by comprehensively considering the hotspot information reported by users within a predetermined time length. All location points of the user corresponding to the same hotspot may constitute the movement trajectory of the hotspot, as shown in FIG. 5, which is a schematic diagram of the movement trajectory of bus Route 820 as shown in FIG. 4.

For each hotspot, indexes of the grid cells through which its movement trajectory passes may be determined, respectively, thereby obtaining the second index encoding result of the hotspot. For a fixed hotspot, there is usually only one grid cell through which its movement trajectory passes. Therefore, the mobile hotspot and the fixed hotspot may be distinguished in this way. Of course, other distinguishing manners commonly used in the art may also be adopted.

After the first index encoding result of each mobile POI and the second index encoding result of each mobile hot spot are obtained respectively, the mobile hotspot may be matched with a mobile POI according to the similarity between the first index encoding result and the second index encoding result.

However, if the similarity between a mobile hotspot and a mobile POI is directly calculated, a very large amount of calculation may be required. For this reason, it is proposed in an embodiment that before the mobile hotspot is matched with a mobile POI of the plurality of mobile POIs, an inverted index may be built according to the first index encoding results of the plurality of mobile POIs in the spatial region. The inverted index records one or more mobile POIs corresponding to indexes of different grid cells respectively. The corresponding one or more mobile POIs are mobile POIs passing through the different grid cells respectively. In this way, for each mobile hotspot, the following processing may be performed: first, selecting one or more candidate mobile POIs corresponding to the mobile hotspot from the plurality of mobile POIs in the spatial region, according to the second index encoding result of the mobile hotspot and the inverted index, and then selecting a mobile POI matched with the mobile hotspot from the one or more candidate mobile POIs according to the similarity between the first index encoding result of each of the one or more candidate mobile POIs and the second index encoding result of the mobile hotspot.

For example, an inverted index in the form of {"12971_4825": [820, 112, . . . ]; "12971_4826": [820,112, . . . ]; "12978_4829": [820, . . . ]; . . . } may be built according to the first index encoding results of the plurality of mobile POIs in the spatial region, where 820 represents bus Route 820, and 112 represents bus Route 112.

It can be seen that all mobile POIs in the spatial region correspond to a common inverted index. If the transport route of a certain mobile POI passes the grid cell "12971_4825", the mobile POI will appear in the mobile POI corresponding to "12971_4825".

A forward index may be built for each mobile POI. The forward index may record detailed information of the mobile POI, such as departure time and a list of indexes of grid cells through which the mobile POI passes, for example in the following form: {"820": "grid_list": ["12971_4825", "12971_4826", "12978_4829", . . . ], "time": ["5:00", "5:20", "5:40", . . . ]}.

It is possible to, for each mobile hotspot, select the one or more candidate mobile POIs corresponding to the mobile hotspot from the plurality of mobile POIs in the spatial region according to the second index encoding result of the mobile hotspot and the inverted index. For example, it is feasible to, for an index of each grid cell in the second index encoding result of the mobile hotspot, determine one or more mobile POIs corresponding to the index by querying the inverted index, and take the determined one or more mobile POIs as the one or more candidate mobile POI corresponding to the mobile hotspot.

For example, the second index encoding result of a mobile hotspot includes indexes of three grid cells which are, for ease of description, referred to as index 1, index 2 and index 3, respectively. For index 1, the mobile POIs, for example, two mobile POIs, corresponding to index 1 may be determined by querying the inverted index. For index 2, the mobile POIs, for example, three mobile POIs, corresponding to index 2 may be determined by querying the inverted index. For index 3, the mobile POIs, for example, three mobile POIs, corresponding to index 3 may be determined by querying the inverted index. As such, there are 2+3+3=8 candidate mobile POIs corresponding to the mobile hotspot.

After the one or more candidate mobile POIs corresponding to the mobile hotspot are determined, a similarity score between the first index encoding result of each candidate mobile POI and the second index encoding result of the mobile hotspot may be calculated, and then a candidate mobile POI with a highest score is determined as the mobile POI matched with the mobile hotspot.

For example, for each candidate mobile POI, the following processing may be performed: determining a number of indexes which are included both in the first index encoding result of the candidate mobile POI and the second index encoding result of the mobile hotspot (the number of indexes may be referred to as the number of repeated indexes hereinafter); calculating a quotient obtained from dividing the number of indexes which are included both in the first index encoding result of the candidate mobile POI and the second index encoding result of the mobile hotspot, by a number of indexes included in the second index encoding result of the mobile hotspot; taking a calculation result as a similarity score between the first index encoding result of the candidate mobile POI and the second index encoding result of the mobile hotspot.

That is: the similarity score=box_num/line_box_num;

Here, box_num represents the number of repeated indexes, and line_box_num represents the number of indexes included in the second index encoding result of the mobile hotspot.

For example, the first index encoding result of the candidate mobile POI includes a total of five indexes, namely, index a, index b, index c, index d and index e, respectively, and the second index encoding result of the mobile hotspot includes a total of six indexes, namely, index a, index b, index c, index d, index e and index f respectively, then box_num is 5.

After the scores of respective candidate mobile POIs are obtained respectively, a candidate mobile POI with a highest score may be selected and determined as the mobile POI matched with the mobile hotspot, thereby completing the matching.

Alternatively, in order to further improve the accuracy of the matching result, it is possible to, while the candidate mobile POI with the highest score is determined as the mobile POI corresponding to the mobile hotspot, first judge whether the score of the candidate mobile POI with the highest score is greater than a predetermined threshold, and if yes, determine the candidate mobile POI with the highest score as the mobile POI matched with the mobile hotspot. In other words, under the condition that the score of the candidate mobile POI with the highest score is greater than a predetermined threshold, he candidate mobile POI with the highest score is determined as the mobile POI matched with the mobile hotspot. The specific value of the threshold may be determined according to actual needs.

It is to be noted that, for ease of description, the aforesaid method embodiments are all described as a combination of a series of actions, but those skilled in the art should appreciate that the present disclosure is not limited to the described order of actions since some steps may be performed in other orders or simultaneously according to the present disclosure. Secondly, those skilled in the art should appreciate the embodiments described in the description are only examples, and the involved actions and modules may not necessarily requisite for the present disclosure.

To sum up, according to the solution according to the embodiments of the method, it is unnecessary to employ a special person to provide equipment and training, the thus the implementation cost may be reduced and the processing efficiency may be improved. Furthermore, the mobile hotspot and the mobile POI may be matched based on the similarity between the index encoding results of the mobile hotspot and mobile POI, and thus the accuracy of the processing result may be ensured.

The above introduces the method embodiment. The solution of the present disclosure will be further described through an embodiment of an apparatus.

Figure 6:
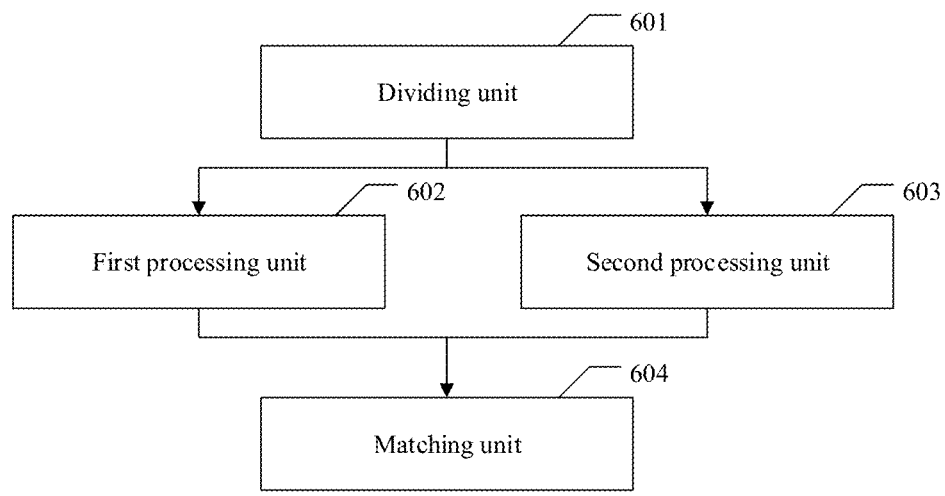
FIG. 6 is a schematic structural diagram of an apparatus for matching a mobile hotspot with a mobile point of interest according to an embodiment of the present disclosure.

FIG. 6 is a schematic structural diagram of an apparatus for matching a mobile hotspot with a mobile point of interest according to an embodiment of the present disclosure. As shown in FIG. 6, the apparatus includes: a dividing unit 601, a first processing unit 602, a second processing unit 603 and a matching unit 604.

The dividing unit 601 is configured to divide a spatial region into a plurality of grid cells of a predetermined size, and generate an index for each of the plurality of grid cells.

The first processing unit 602 is configured to, for each mobile POI of a plurality of mobile POIs in the spatial region, determine respectively indexes of grid cells through which a transport route of the mobile POI passes, to obtain a first index encoding result of the mobile POI, and the mobile POI being a transport vehicle having a fixed commuting route.

The second processing unit 603 is configured to, for a mobile hotspot in the spatial region, obtain a movement trajectory of the mobile hotspot, determine respectively indexes of the grid cells through which the movement trajectory passes, to obtain a second index encoding result of the mobile hotspot.

The matching unit 604 is configured to match the mobile hotspot with a mobile POI of the plurality of mobile POIs according to a similarity between the first index encoding result and the second index encoding result.

The spatial region may refer to any spatial region, for example, regard the city of Beijing as a spatial region or the whole country as a spatial region.

The dividing unit 601 may first divide the spatial region according to grid cells of a predetermined size, i.e., may divide the spatial region into a plurality of grid cells of the same size, and may generate the index of each grid cell as a grid cell number. How to generate the index is not limited, but the index of each grid cell needs to be different from indexes of other grid cells, that is, the index of each grid cell is unique.

The first processing unit 602 may, for each mobile POI in the spatial region, determine respectively indexes of grid cells through which the transport route of the mobile POI passes, thereby obtaining the first index encoding result of the mobile POI.

The mobile POI is a transport vehicle having a fixed commuting route, and may include a bus, a subway, a train, and the like. For each mobile POI, its transport route is known. Correspondingly, the grid cells the transport route has passed and thus the index of each grid cell may be determined, and thereby obtain an index encoding result of the mobile POI.

In addition, the second processing unit 603 may, for each mobile hotspot in the spatial region, obtain the movement trajectory of the mobile hotspot, and determine respectively indexes of the grid cells through which the movement trajectory passes, and thereby obtain the second index encoding result of the mobile hotspot.

The second processing unit 603 may determine the movement trajectory of each mobile hotspot according to obtained hotspot information scanned by a user.

A user may report the scanned hotspot information which for example may include scanned media access control (MAC) address of wifi, signal strength, corresponding base station and scanning time, a location point of the user can be known, and then the movement trajectory of each hotspot may be determined by comprehensively considering the hotspot information reported by users within a predetermined time length. All location points of the user corresponding to the same hotspot may constitute the movement trajectory of the hotspot.

The matching unit 604 may match the mobile hotspot with a mobile POI according to the similarity between the first index encoding result and the second index encoding result.

In an embodiment, the first processing unit 602 may further build an inverted index according to the first index encoding results of the plurality of mobile POIs in the spatial region. The inverted index records one or more mobile POIs corresponding to indexes of different grid cells respectively. The corresponding one or more mobile POIs are mobile POIs passing through the different grid cells respectively.

As such, the matching unit 604 may, for each mobile hotspot, perform the following processing: first, selecting one or more candidate mobile POIs corresponding to the mobile hotspot from the plurality of mobile POIs in the spatial region, according to the second index encoding result of the mobile hotspot and the inverted index; selecting a mobile POI matched with the mobile hotspot from the one or more candidate mobile POIs according to the similarity between the first index encoding result of each of the one or more candidate mobile POIs and the second index encoding result of the mobile hotspot.

For example, the matching unit 604 may, for an index of each grid cell in the second index encoding result of the mobile hotspot, determine one or more mobile POIs corresponding to the index by querying the inverted index, and take the determined one or more mobile POIs as the one or more candidate mobile POI corresponding to the mobile hotspot.

The matching unit 604 may calculate a similarity score between the first index encoding result of each candidate mobile POI and the second index encoding result of the mobile hotspot, and determine a candidate mobile POI with a highest score as the mobile POI matched with the mobile hotspot.

Specifically, the matching unit 604 may, for each candidate mobile POI, perform the following processing: determining a number of indexes which are included both in the first index encoding result of the candidate mobile POI and the second index encoding result of the mobile hotspot; calculating a quotient obtained by dividing the number of repeated indexes by the number of indexes included in the second index encoding result of the mobile hotspot; taking a calculation result as a similarity score between the first index encoding result of the candidate mobile POI and the second index encoding result of the mobile hotspot.

The matching unit 604 may, while the candidate mobile POI with the highest score is determined as the mobile POI corresponding to the mobile hotspot, first judge whether the score of the candidate mobile POI with the highest score is greater than a predetermined threshold, and if yes, determine the candidate mobile POI with the highest score as the mobile POI matched with the mobile hotspot. In other words, under the condition that the score of the candidate mobile POI with the highest score is greater than a predetermined threshold, the matching unit 604 determines the candidate mobile POI with the highest score as the mobile POI matched with the mobile hotspot.

Reference may be made to corresponding depictions in the aforesaid method embodiment for a specific workflow of the apparatus embodiment shown in FIG. 6. The workflow is not detailed any more.

Figure 7:
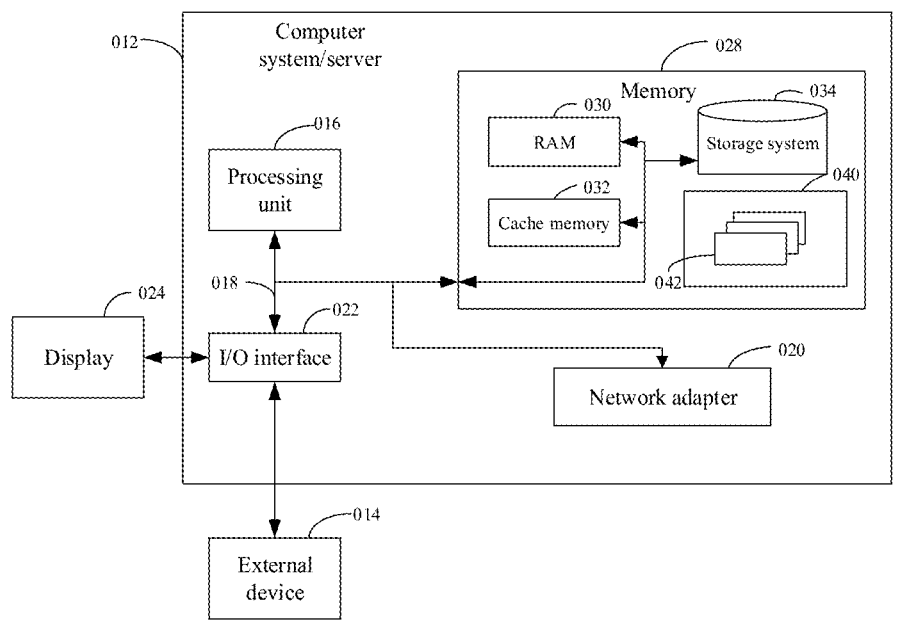
FIG. 7 is a block diagram of a computer system/server 12 adapted to implement an embodiment of the present disclosure.

FIG. 7 illustrates a block diagram of an example computer system/server 12 adapted to implement an implementation mode of the present disclosure. The computer system/server 12 shown in FIG. 7 is only an example and should not bring about any limitation to the function and scope of use of the embodiments of the present disclosure.

As shown in FIG. 7, the computer system/server 12 is shown in the form of a general-purpose computing device. The components of computer system/server 12 may include, but are not limited to, one or more processors (processing units) 16, a memory 28, and a bus 18 that couples various system components including system memory 28 and the processor 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 7 and typically called a "hard drive"). Although not shown in FIG. 7, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. The memory 28 may include at least one program product having a set (e.g., at least one) of program modules that are configured to carry out the functions of embodiments of the present disclosure.

Program/utility 40, having a set (at least one) of program modules 42, may be stored in the system memory 28 by way of example, and not limitation, as well as an operating system, one or more disclosure programs, other program modules, and program data. Each of these examples or a certain combination thereof might include an implementation of a networking environment. Program modules 42 generally carry out the functions and/or methodologies of embodiments of the present disclosure.

Computer system/server 12 may also communicate with one or more external devices 14 such as a keyboard, a pointing device, a display 24, etc.; with one or more devices that enable a user to interact with computer system/server 12; and/or with any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted in FIG. 7, network adapter 20 communicates with the other communication modules of computer system/server 12 via bus 18. It should be understood that although not shown, other hardware and/or software modules could be used in conjunction with computer system/server 12. Examples, include, but are not limited to: microcode, device drivers, redundant processing units, external disk drive arrays, RAID systems, tape drives, and data archival storage systems, etc.

The processor 16 executes various function applications and data processing by running programs stored in the memory 28, for example, implement the method in the embodiments shown in FIG. 1.

The present disclosure meanwhile proposes a computer-readable storage medium on which a computer program is stored, the program, when executed by the processor, implementing the method stated in the embodiment shown in FIG. 1.

The computer-readable medium of an embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments of the present disclosure, it should be understood that the apparatus and method disclosed may be implemented in other ways. For example, the above-described embodiments for the apparatus are only exemplary, e.g., the division of the units is merely logical one, and, in reality, they may be divided in other ways upon implementation.

The units described as separate parts may be or may not be physically separated, the parts shown as units may be or may not be physical units, i.e., they may be located in one place, or distributed in a plurality of network units. One may select some or all the units to achieve the purpose of the embodiment according to the actual needs.

Further, in the embodiments of the present disclosure, functional units may be integrated in one processing unit, or they may be separate physical presences; or two or more units may be integrated in one unit. The integrated unit described above may be implemented in the form of hardware, or they may be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method for matching a mobile hotspot with a mobile point of interest (POI), comprising:
   dividing a spatial region into a plurality of grid cells of a predetermined size, and generating an index for each of the plurality of grid cells;
   for each mobile POI of a plurality of mobile POIs in the spatial region, determining respectively indexes of grid cells through which a transport route of the mobile POI passes, to obtain a first index encoding result of the mobile POI, the mobile POI being a transport vehicle having a fixed commuting route;
   for a mobile hotspot in the spatial region, obtaining a movement trajectory of the mobile hotspot, determining respectively indexes of grid cells through which the movement trajectory passes, to obtain a second index encoding result of the mobile hotspot;
   matching the mobile hotspot with a mobile POI of the plurality of mobile POIs according to a similarity between the first index encoding result and the second index encoding result.

2. The method according to claim 1, wherein the obtaining a movement trajectory of the mobile hotspot comprises:
   determining the movement trajectory of the mobile hotspot according to obtained hotspot information scanned by a user.

3. The method according to claim 1, wherein before matching the mobile hotspot with a mobile POI of the plurality of mobile POIs, the method further comprises:
   building an inverted index according to the first index encoding results of the plurality of mobile POIs in the spatial region, the inverted index recording one or more mobile POIs corresponding to indexes of different grid cells respectively, wherein the one or more mobile POIs passing through the different grid cells respectively;
   the matching the mobile hotspot with a mobile POI of the plurality of mobile POIs comprises:
   selecting one or more candidate mobile POIs corresponding to the mobile hotspot from the plurality of mobile POIs in the spatial region, according to the second index encoding result of the mobile hotspot and the inverted index;
   selecting a mobile POI matched with the mobile hotspot from the one or more candidate mobile POIs, according to the similarity between the first index encoding result of each of the one or more candidate mobile POIs and the second index encoding result of the mobile hotspot.

4. The method according to claim 3, wherein the selecting one or more candidate mobile POIs corresponding to the mobile hotspot from the plurality of mobile POIs in the spatial region comprises:
   for an index of each grid cell in the second index encoding result of the mobile hotspot, determining one or more mobile POIs corresponding to the index by querying the inverted index, and taking the determined one or more mobile POIs as the one or more candidate mobile POI.

5. The method according to claim 3, wherein the selecting a mobile POI matched with the mobile hotspot from the one or more candidate mobile POIs comprises:
   calculating a similarity score between the first index encoding result of each candidate mobile POI and the second index encoding result of the mobile hotspot, and determining a candidate mobile POI with a highest score as the mobile POI matched with the mobile hotspot.

6. The method according to claim 5, wherein the calculating a similarity score between the first index encoding result of each candidate mobile POI and the second index encoding result of the mobile hotspot comprises:
   for each candidate mobile POI, performing the following processing:
   determining a number of indexes which are included both in the first index encoding result of the candidate mobile POI and the second index encoding result of the mobile hotspot;
   calculating a quotient obtained by dividing the number of indexes which are included both in the first index encoding result of the candidate mobile POI and the second index encoding result of the mobile hotspot by a number of indexes included in the second index encoding result of the mobile hotspot;
   taking a calculation result as a similarity score between the first index encoding result of the candidate mobile POI and the second index encoding result of the mobile hotspot.

7. The method according to claim 5, wherein the determining a candidate mobile POI with a highest score as the mobile POI matched with the mobile hotspot further comprises:
   under the condition that the score of the candidate mobile POI with the highest score is greater than a predetermined threshold, determining the candidate mobile POI with the highest score as the mobile POI matched with the mobile hotspot.

8. A computer device, comprising a memory, a processor and a computer program which is stored on the memory and runs on the processor, wherein the processor, upon executing the program, implements a method for matching a mobile hotspot with a mobile point of interest (POI), wherein the method comprises:
   dividing a spatial region into a plurality of grid cells of a predetermined size, and generating an index for each of the plurality of grid cells;

for each mobile POI of a plurality of mobile POIs in the spatial region, determining respectively indexes of grid cells through which a transport route of the mobile POI passes, to obtain a first index encoding result of the mobile POI, the mobile POI being a transport vehicle having a fixed commuting route;

for a mobile hotspot in the spatial region, obtaining a movement trajectory of the mobile hotspot, determining respectively indexes of grid cells through which the movement trajectory passes, and obtaining a second index encoding result of the mobile hotspot;

matching the mobile hotspot with a mobile POI of the plurality of mobile POIs according to a similarity between the first index encoding result and the second index encoding result.

9. A computer-readable storage medium on which a computer program is stored, wherein the program, when executed by a processor, implements a method for matching a mobile hotspot with a mobile point of interest (POI), wherein the method comprises:

dividing a spatial region into a plurality of grid cells of a predetermined size, and generating an index for each of the plurality of grid cells;

for each mobile POI of a plurality of mobile POIs in the spatial region, determining respectively indexes of grid cells through which a transport route of the mobile POI passes, to obtain a first index encoding result of the mobile POI, the mobile POI being a transport vehicle having a fixed commuting route;

for a mobile hotspot in the spatial region, obtaining a movement trajectory of the mobile hotspot, determining respectively indexes of grid cells through which the movement trajectory passes, and obtaining a second index encoding result of the mobile hotspot;

matching the mobile hotspot with a mobile POI of the plurality of mobile POIs according to a similarity between the first index encoding result and the second index encoding result.

\* \* \* \* \*